Inventor
Peter Fortescue
Francis R. Bell
Soans, Anderson, Luedeka & Welch
Attys

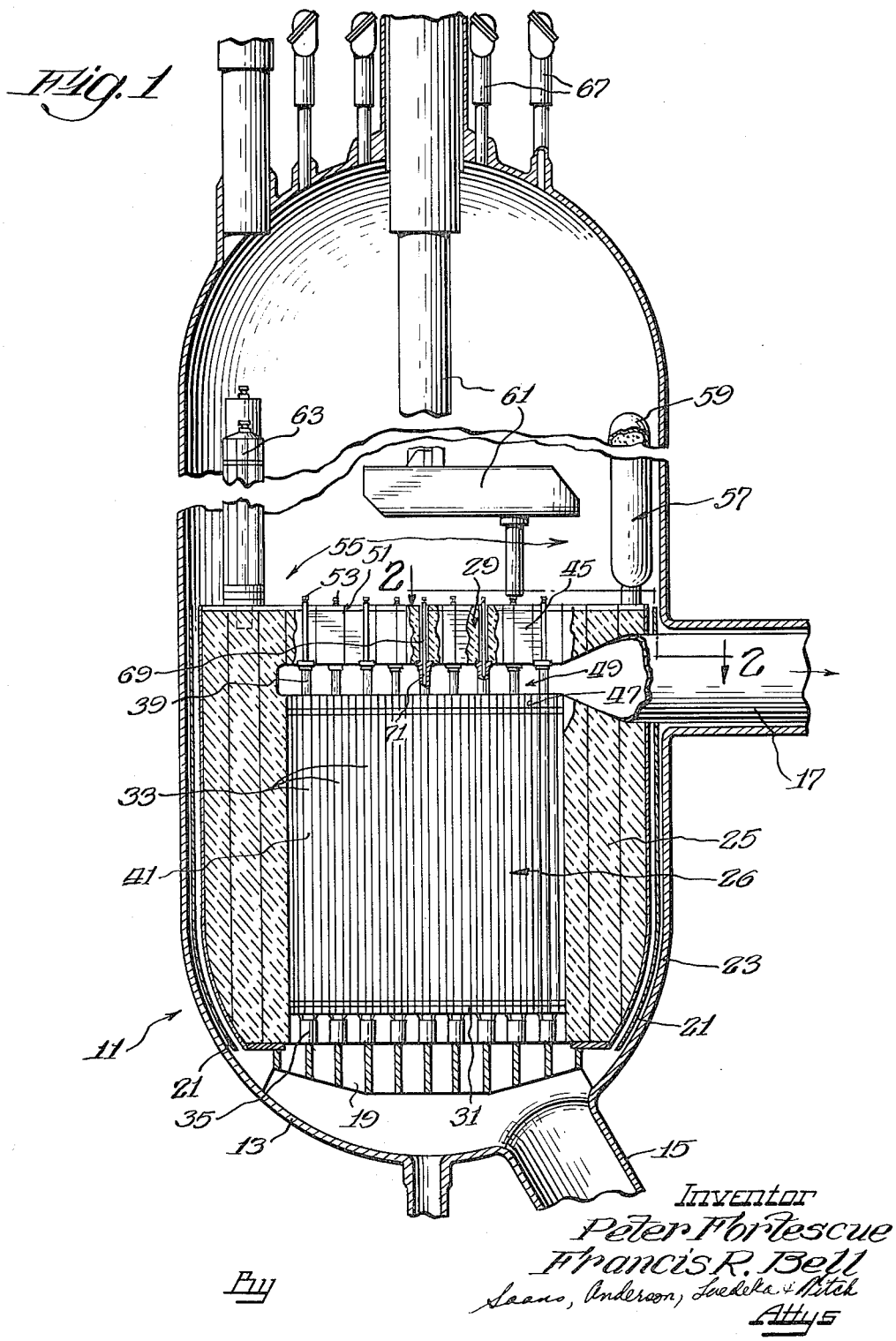

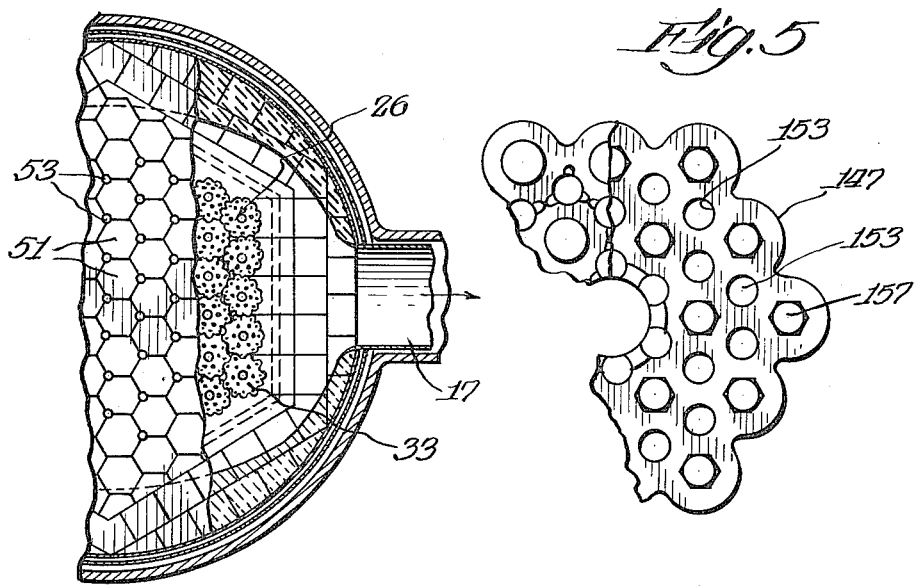
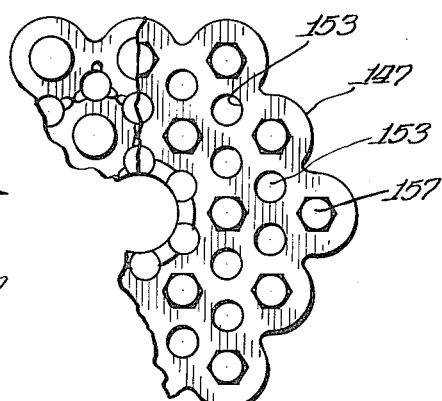
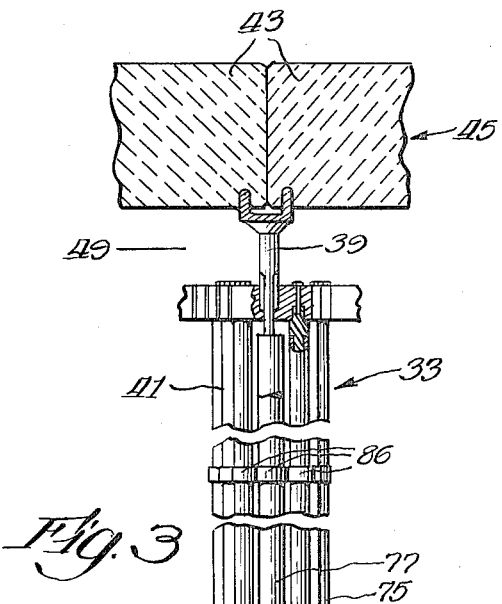
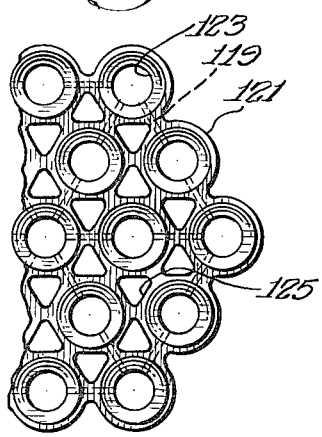

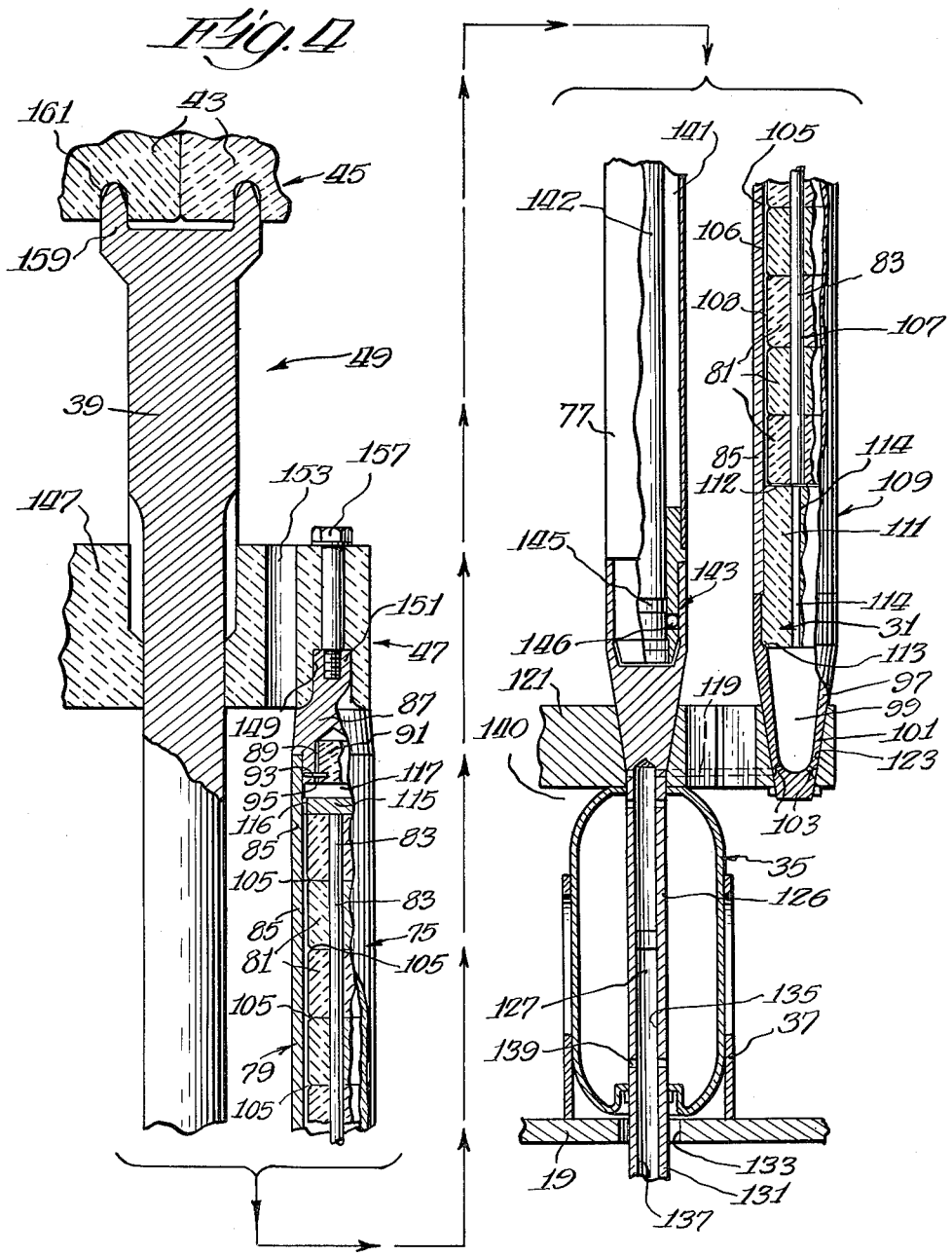

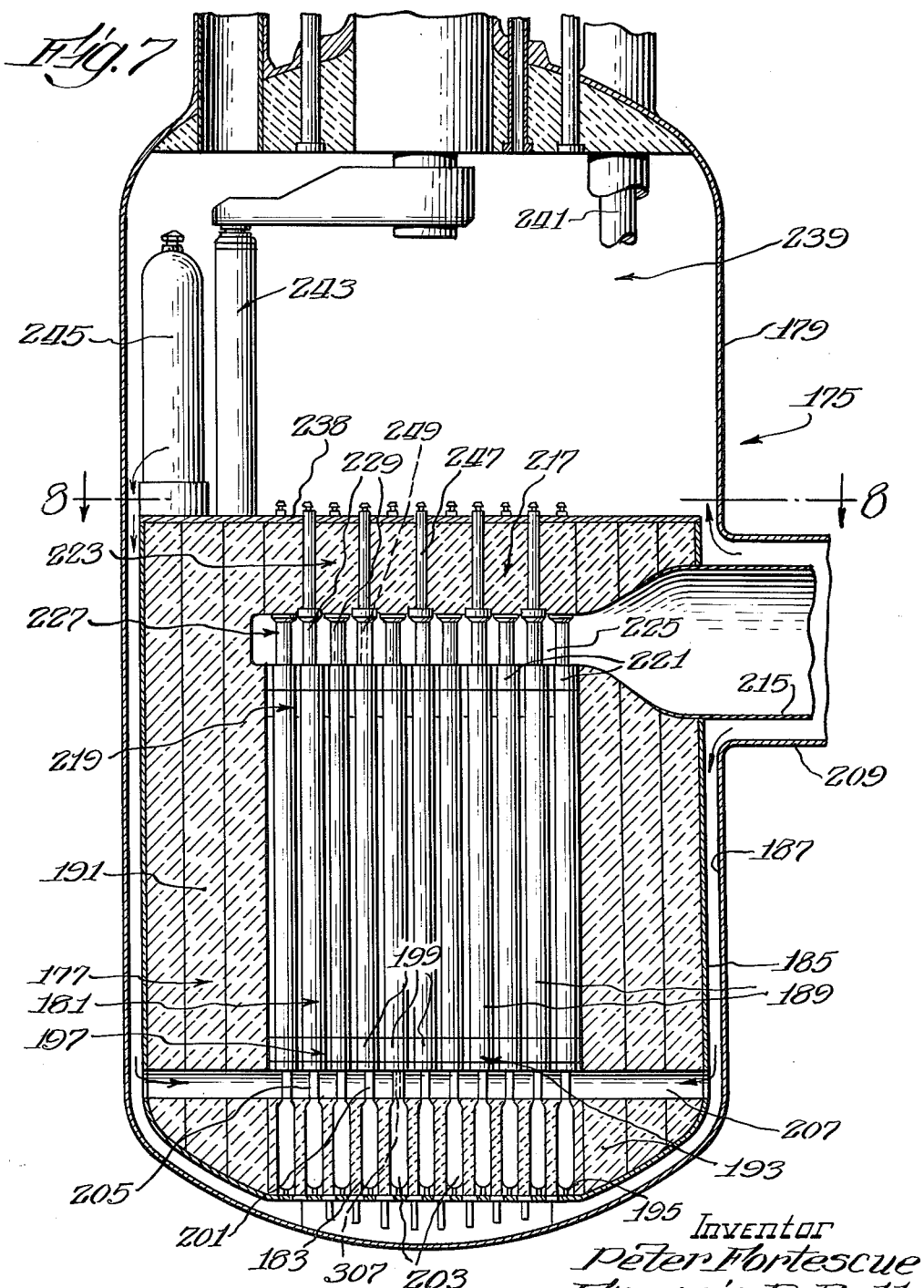

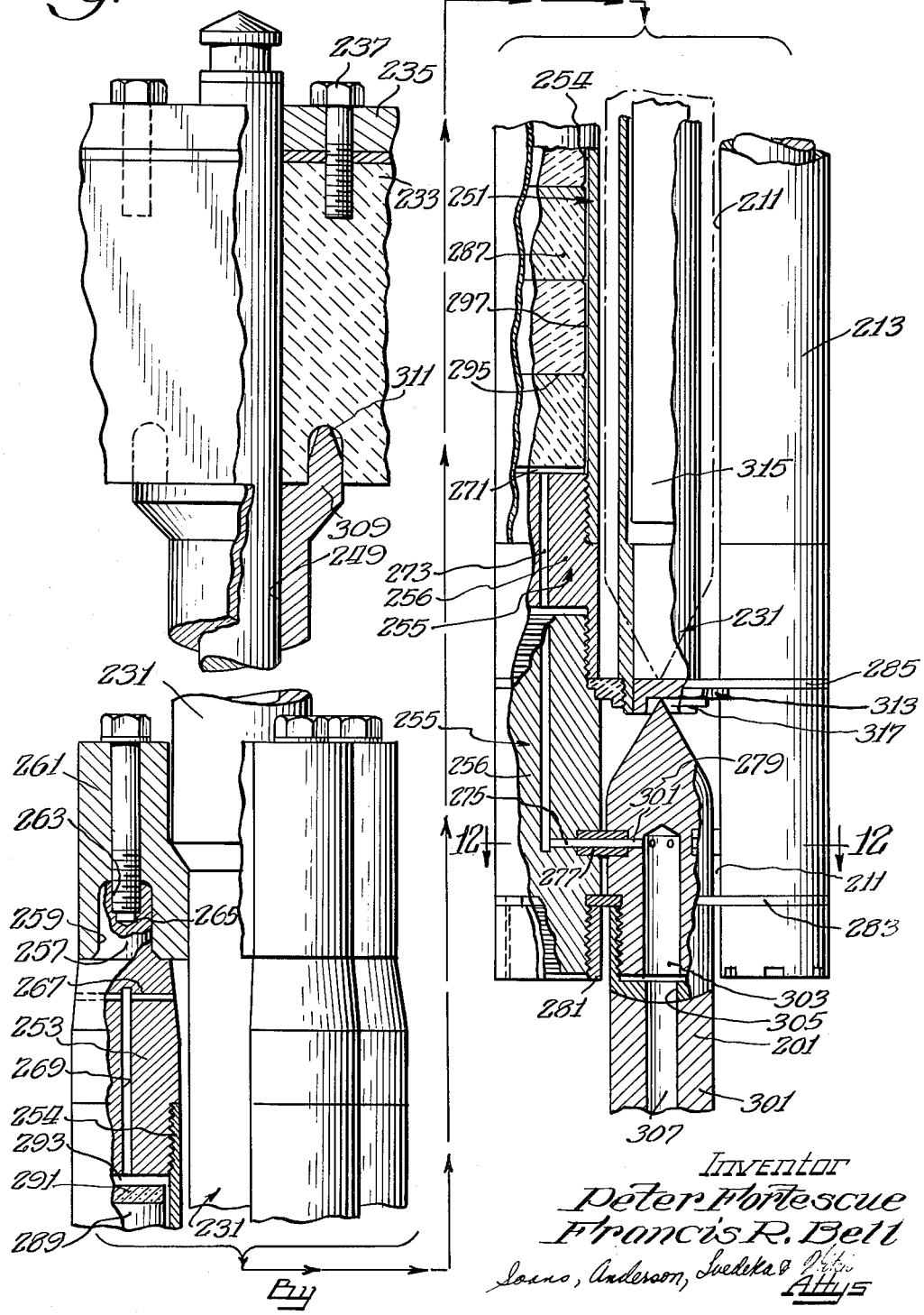

United States Patent Office 3,207,670
Patented Sept. 21, 1965

3,207,670
GAS COOLED NUCLEAR REACTOR WITH IMPROVED COOLANT FLOW PATH ARRANGEMENT AND FUEL ASSEMBLY THEREFOR
Peter Fortescue, Rancho Santa Fe, Calif., and Francis R. Bell, Zurich, Switzerland, assignors to General Dynamics Corporation, New York, N.Y., a corporation of Delaware
Filed Dec. 4, 1961, Ser. No. 156,917
19 Claims. (Cl. 176—37)

The present invention generally relates to nuclear reactors and more particularly relates to an improved arrangement of structure in a gas cooled high temperature nuclear reactor.

Economy is a prime consideration in the generation of power by nuclear reactors operating by the well known fission process. In this regard, it is important to obtain as high a degree of efficiency as possible in the transfer of heat from the reactor core under controlled conditions. Gas cooled nuclear reactors increase thermal efficiency of heat transfer from the reactor core since gaseous coolant does not limit the temperature of operation of the reactor, in contrast to liquid cooled reactor systems. At high operating temperatures of which gas cooled nuclear reactors are capable, thermal efficiency in transferring heat from the reactor core to the coolant is considerably increased. Accordingly, various types of gas cooled nuclear reactors have been utilized for the generation of power and for other purposes. Examples of gas cooled nuclear reactors are set forth, for example, in U.S. Patent No. 2,827,529 to Binner et al., U.S. Patent No. 2,831,807 to McGarry, U.S. Patent No. 2,782,158 to Wheeler and U.S. Patent No. 2,714,577 to Fermi et al.

In high temperature gas cooled reactors, it has been found possible and expedient to eliminate the metal cladding for the fuel elements and to rely upon graphite or similar moderator treated so as to have a low permeability to fission products as the containment for the fuel. Moreover, by mixing the fuel and moderator together there is ordinarily effected an improvement in neutron economy while permitting relatively high temperature operation such as is required in high temperature gas cooled reactors. However, containment and handling of fission products presents a problem once the metal cladding for the fuel element is eliminated. Accordingly, it is desirable in such a reactor to provide simple but efficient means for minimizing the escape of fission products into the primary coolant circuit. It is also desirable to provide efficient means for storage and disposal of fission products as they accumulate during reactor operation.

In view of the expanding number of uses to which nuclear reactors can be applied, it is also desirable to design nuclear reactors so that a series of such reactors can be constructed, varying the size and power output but with generally similar components. In such instances, it has been found that it is usually undesirable to merely increase or decrease the size of the fuel elements in the reactor core because of considerations regarding power density. Instead, a larger or smaller number of fuel elements may be required. For example, in constructing a certain type of 80 megawatt high temperature gas-cooled power reactor, it is possible to employ fuel elements of approximately the same size as those used in a 40 megawatt smaller reactor of the same general type. However, the 80 megawatt reactor should employ an increased number of the fuel elements. Conversely, in providing a 20 megawatt reactor, fuel elements of approximately the same size but fewer in number than a 40 megawatt reactor of the same type can be employed. Improved neutron economy in the reactor core is thereby obtained. Whatever the size of the reactor, it is of importance to simplify means for the insertion and removal of the fuel elements and control rods, and to assure positive location thereof in the reactor core. It is further desirable to design the reactor so that refueling of the reactor core can be carried out on a semi-continuous basis in order to reduce the down-time of the reactor. The reactor core assembly, of course, should be structurally stable and capable of long-continued operation, despite growth of components, a condition likely to occur when graphite is used in the construction of the reactor core. In this regard, it is desirable to minimize stresses and strains on components while in the core, such as by establishing hydrodynamic balance on core components, and also stresses and strains normally encountered by fuel components during fueling and refueling.

Accordingly, it is the principal object of the present invention to provide an improved arrangement of structure in a high temperature gas cooled nuclear reactor core assembly which affords improved stability and durability of core components while permitting expansion of such components in the core. It is another object of the present invention to provide improved reactor core assemblies adaptable for use in various power output reactors, and which permit semi-continuous refueling during reactor operation. It is still another object of the present invention to provide improved fuel components for a high temperature, gas cooled nuclear reactor, which fuel components contribute to increased efficiency of operation of the reactor and are arranged for easy removal and insertion in the reactor core while undergoing minimal stresses. It is still another object of the present invention to provide improved compact reactor core assemblies for high temperature, gas cooled nuclear reactors which assemblies efficiently provide improved containment of fission products.

Further objects and advantages of the present invention will be apparent from a study of the following detailed description and of the accompanying drawings of which:

FIGURE 1 is a vertical section of one preferred embodiment of the nuclear reactor core assembly of the present invention;

FIGURE 2 is a sectional view taken along the section line 2—2 of FIGURE 1;

FIGURE 3 is a side elevation of a typical fuel cluster supported in the reactor core of FIGURE 1;

FIGURE 4 is an enlarged vertical section of a portion of the fuel cluster of FIGURE 3;

FIGURE 5 is a top plan view of the top block of the fuel element cluster of FIGURE 3;

FIGURE 6 is a top plan view of the bottom rack of the fuel element cluster of FIGURE 3;

FIGURE 7 is a vertical section of a second preferred embodiment of the nuclear reactor core assembly of the present invention;

FIGURE 10 is an enlarged vertical section of a portion of the fuel element cluster of FIGURE 9;

Figure 8:
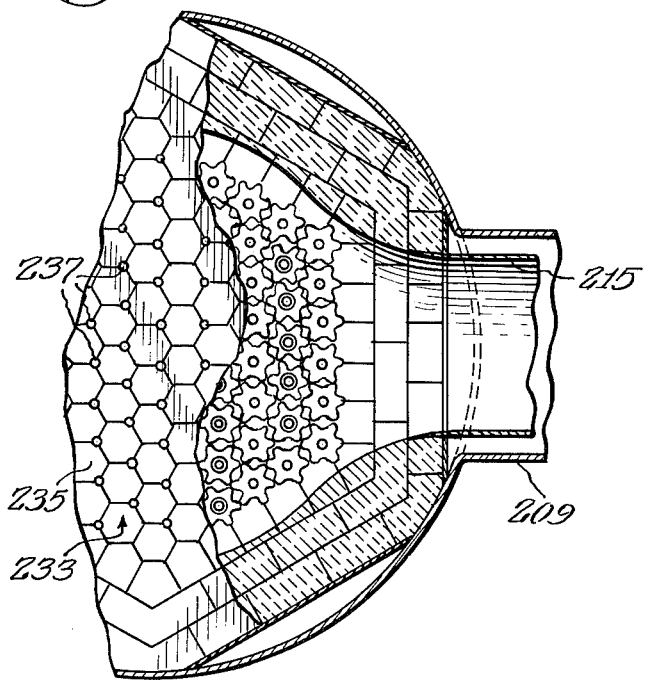
FIGURE 8 is a sectional view taken along the section line 8—8 of FIGURE 7.

The present invention generally comprises an improved arrangement of structure in a gas cooled, high temperature nuclear reactor. More particularly, the improved structure comprises an improved reactor core assembly which includes an impoved arrangement of fuel elements within the reactor core.

The reactor core assembly is compact and adapted for use with high temperature, gas cooled nuclear reactors having various power outputs. Greater power per size of the overall reactor including containments can be provided. The reactor core assembly is constructed so that a gaseous coolant passes from a bottom inlet in the reactor vessel up around the fuel elements and exits the reactor vessel below the upper portion of the reactor core top reflector, which is positioned about midway in the reactor vessel. A portion of coolant from the inlet passes between thermal shields to the space in the reactor vessel above the top reflector. This arrangement maintains such space at a temperature approximating that of the coolant at the inlet, rather than at the temperature of the hot exhaust coolant. Accordingly, this permits the use of simple top operated cable type control rod drives within the reactor vessel above the top reflector plane. Control rods can enter the hot face of the reactor core through suitable shielding means, also simplifying their construction. It also eliminates the necessity of having an inner metal top shroud separating the inlet from the outlet. Suitable fuel element handling machinery can also be provided in the indicated space, as can fission product trap delay beds for containment of fission products. Easy and efficient removal and insertion of fuel elements in the reactor core and storage thereof within the reactor vessel can thereby be provided. The fuel elements, in accordance with the present invention, are arranged in clusters to facilitate handling thereof for semi-continuous refueling during reactor operation.

Moreover, the lower portion of the top reflector is arranged so that it can sit loosely on the fuel elements in the fuel clusters and allow individual expansion of the fuel clusters. Hydrodynamic balance can be provided in the reactor core assembly by providing coolant inlet pressure at both the top and bottom of the reactor core.

Now referring more particularly to FIGURE 1 of the accompanying drawings, one preferred embodiment of a reactor core assembly 11 of the present invention is illustrated. The reactor core assembly 11 is suitable for use in, for example, a high power (80 emw.) high temperature gas cooled nuclear reactor. The reactor core assembly 11 includes a steel pressure vessel 13 which is disposed within a suitable confining structure (not shown) of concrete or the like and is in communication with a source of gaseous coolant (not shown), such as helium, and with a steam generator or other suitable means (not shown) for utilizing the heated exhaust coolant in power conversion. Such communication is provided by a pair of coolant ducts, that is, a cold coolant inlet duct 15 adjacent the bottom of the pressure vessel, and a hot exhaust gas outlet duct 17 disposed adjacent the middle of the pressure vessel.

The lower portion of the pressure vessel 11 includes a perforated horizontal grid plate 19, fabricated of steel or the like, which is connected along the periphery thereof to the innermost of a plurality of thermal shields 21 which are spaced inwardly from the side wall 23 of the pressure vessel and from each other and which extend between the grid plate and the top of the reactor core. The thermal shields 21 are secured at the bottom ends thereof to the pressure vessel. A side reflector 25 of moderator such as graphite or the like is provided around a reactor core 26 inwardly of the thermal shields and rests on the grid plate 19, as shown in FIGURE 1.

The reactor core 26 is also provided with a top reflector 29 and a bottom reflector 31, as more fully described hereinafter. The reactor core is hexagonally shaped, as shown in FIGURE 2, supported upon the grid plate and includes a plurality of fuel element clusters 33, such as that illustrated in FIGURE 3, each cluster being individually supported in a vertical position on the grid plate by an integrally connected metal fission product trap vessel 35 held in a vertical position by a suitable metal guide tube 37 secured to the upper surface of the grid plate, as shown in FIGURE 4.

Each of the fuel element clusters 33 has a lower moderator portion fabricated of graphite or other moderator material, such as beryllia, etc., and the clusters together form the bottom reflector 31 for the reactor core. The upper end of each fuel element cluster is also constructed of moderator, such as graphite, so that the fuel element clusters together also form the lower portion 47 of the top reflector 29 for the reactor core.

A graphite or other moderator strut 39 is provided by each cluster, the top end of which strut 39 extends above the upper end of the main body 41 of the cluster. Each support strut 39 interlocks with two adjoining hexagonally shaped reflector blocks 43 of moderator, preferably graphite, reflector blocks 43 collectively forming the upper portion 45 of the top reflector 29. The struts hold the reflector blocks in the desired spaced relation from the lower portion 47 of the top reflector, as shown in FIGURE 1.

Hexagonal metal plates 51 are provided on the top surface of the reflector blocks 43 to provide suitable sealing means and are connected to the blocks as by bolts, 53 etc.

Accordingly, a space 49 is provided as shown in FIGURE 1, between the upper portion 45 of the top reflector 29 and the lower portion 47 of the same reflector through which hot exhaust coolant circulates radially outwardly from the fuel element clusters to the outlet duct 17. The described arrangement allows a space 55 above the plates 51 to be maintained at or below the temperature of the coolant gas at the inlet duct 15, since such coolant from the inlet duct circulates up between the thermal shields 21 and into space 55 and since space 55 is thermally shielded from the hot exhaust coolant by the upper portion 45 of the top reflector, as shown in FIGURE 1.

It is practical to provide in the space 55 above the metal plates within the pressure vessel 13, as illustrated in FIGURE 1, a plurality of fission product traps 57 comprising metal containers 59 containing activated charcoal or the like trapping agent (not shown). The traps 57 are preferably of approximately the same size and shape as the fuel element clusters 33 in order to facilitate their handling by a suitable handling means, such as the fuel handling machine 61 shown in FIGURE 1. The fuel handling machine 61 can be disposed within the same space 55 and can provide for insertion and withdrawal of fuel element clusters to and from the reactor core and for canning and storage of spent fuel element clusters 33 which have been removed from the reactor core. Such a canned cluster 63 is illustrated in FIGURE 1.

The upper portion of the pressure vessel 13 is provided with control rod drives 67 and other auxiliary equipment conventional in nuclear reactor construction. A plurality of control rods 69 are provided in the reactor core assembly and are capable of being extended down through the upper portion 45 of the top reflector block. The control rods 69 are shielded from the hot exhaust coolant, since they pass downwardly through suitable centrally disposed longitudinal cavities 71 in moderator support struts of certain fuel element clusters 33, as shown in FIGURE 1.

The reactor core is maintained in hydrodynamic balance, since coolant at inlet pressure is present both in the space 55 above the top reflector and also below the grid plate.

Now referring more particularly to FIGURE 3 of the accompanying drawings, a typical fuel element cluster 33 utilized in the reactor core 29 shown in FIGURE 1 is illustrated. The fuel element cluster 33 comprises a plurality, such as 18, shown in FIGURE 3, fuel-containing elements 75 disposed in an annular array around a central element 77 comprising a rod of moderator, preferably graphite, the upper end of which forms the described support strut 39 for the upper portion of the top reflector.

As shown in FIGURE 4, each fuel element 75 of each cluster comprises an elongated cylindrical container 79 largely fabricated of moderator, such as graphite, beryllia, etc., which has been suitably treated as to have a low permeability to the passage of fission products, e.g., a helium permeability of between about $5 \times 10^{-4}$ cm.²/sec. and about $1 \times 10^{-5}$ cm.²/sec. at room temperature.

Reduction in the permeability of graphite can be accomplished by coating, impregnating, vapor plating, hot dipping, spraying, firing and other suitable operations known in the art. Examples of graphite permeability-reducing techniques, such as may be employed, are specified in co-pending U.S. applications Serial No. 784,064 to Goeddel et al., filed December 31, 1958, now U.S. Patent No. 3,031,389, and Serial No. 784,071 to Goeddel et al., also filed December 31, 1958, now U.S. Patent No. 3,001,238.

Slidably enclosed in the container 79 are a plurality of vertically stacked annular fuel compacts 81 slidably disposed around a central spine 83 of low permeability moderator, such as low permeability graphite, beryllium carbide, etc. The arrangement of fuel compacts, spine and container may be as is generally set forth in co-pending U.S. application, Serial No. 128,275 of Messrs. Koutz, Turner and Fortescue, filed July 31, 1961, now U.S. Patent No. 3,135,665.

The cylindrical container 79 may be provided with one or more spacer pads 86, as shown in FIGURE 3. The container 79 includes a cylindrical sleeve 85 fabricated low permeability moderator, such as low permeability graphite, as described, to the upper end of which is connected, as by screwing and welding, a porous graphite or other porous moderator reflector block 87 having a central passageway 89 therein extending down to the bottom of the block, as shown in FIGURE 4. The block 87 may be, for example, fabricated of normal graphite which has substantial permeability to helium. The passageway 89 may be fitted with a loosely fitting plug 91, held in place, as by a pin 93, so that an annular space 95 is provided between the plug and block 87. The lower end of the sleeve 85 is connected, as by welding or the like, to a tapered metal coupling 97, for example fabricated of stainless steel, having a central cavity 99 the lower end 101 of which coupling has a plurality of passageways 103 extending from the cavity 99 to the exterior of the coupling, through which coolant gas containing fission products can pass, as more fully described hereinafter.

Each fuel compact 81 comprises a mixture of nuclear fuel and moderator. The fuel may comprise fissile material or a mixture of fertile and fissile material. For example, uranium 235 or plutonium can be used as the fissile material, and uranium 238 or thorium 232 can be used as the fertile material. The relative proportions of fuel constituents and the total amount of such constituents within each fuel compact and within the reactor core will generally depend upon the requirements of the reactor. In each compact the fuel concentration may be maintained at, for example, about 30 percent of the total weight of the fuel compact, with the moderator comprising the remainder. Such moderator can be graphite, beryllia, etc., but graphite is preferred.

Each fuel compact is in the form of a ring, and preferably, the ring is split with, for example, a 1/32 to 1/8 inch gap between halves to prevent cracking of the container sleeve 85 surrounding the fuel compacts when the sleeve contracts relative to the compacts.

In the compacts, the fertile and fissile material is present preferably in the carbide form as particles of controlled size, usually between about 200 and 400 microns, and preferably between about 200 and 300 microns. Each fuel particle is also preferably pre-treated by coating in any suitable manner with a suitable moderator such as pyrolytic carbon to a coating thickness of preferably from about 50 to 75 microns. The coating can be applied by spraying, painting, dipping, etc. and additional steps can be utilized to assure firm adherence thereof to the fuel particles. Such coating has the effect of decreasing the rate of migration of fission products from the fuel. The micron size of the fuel particles is controlled so that a sufficient amount of moderator when mixed with the fuel is disposed between the fuel particles to reduce radiation damage to the moderator by recoiling fission products.

The fuel compacts can be formed in any suitable manner, for example by cold pressing, followed by warm pressing and sintering, as particularly described in copending U.S. application Serial No. 128,275 to Koutz et al. Other suitable methods of forming the fuel compacts 81 can be utilized. In this regard, a warm pressing operation can be carried out without a preceding cold pressing operation, but followed by a heat stabilizing treatment, also as particularly described in the indicated Koutz et al. application, U.S. Serial No. 128,275.

Each of the plurality of fuel compacts is preferably bevelled along the upper and lower margins thereof, for example, with a 10° bevel, so that when the plurality of compacts are stacked on the central spine of moderator, the adjoining bevelled areas of respective compacts provide annular horizontally extending grooves or passageways 105 for circulation of purge gas in intimate contact therewith.

The fuel compacts are also preferably provided with a plurality of longitudinally extending grooves 106 along the periphery thereof, as described in the above-indicated Koutz et al. application, the grooves mating in the stacked compacts to form vertical passageways 108 between the sleeve 85 and the compacts 81 for conduction of fission products from the upper end of the fuel element down to the lower end of the fuel element 75.

However, if desired, the compacts 81 can be merely loosely disposed within the sleeve 85 so as to provide an annular space (not shown) between the compacts 81 and sleeve 85 to effect essentially the same purposes as the vertical grooves and bevelled areas previously described, allowing circulation of the purge gas over the face of the compacts.

The stack of fuel compacts and the central spine form the central active portion 107 of each fuel element 75. Below the active portion 107 and forming a support therefor is a lower reflector portion 109 of the fuel element comprising one or more vertically stacked moderator blocks 111 preferably provided with a transverse passageway 112 adjacent the top of the uppermost block, which passageway 112 is in communication with both the passageways 108 and with a central passageway 114 extending down through the blocks 111 to the cavity 99 in the coupling 97. The lower edge of the bottom reflector block 111 rests in a curved portion or recess 113 in the metal coupling 95, as illustrated in FIGURE 4.

A cap 115 rests on the upper end of the stack of compacts 81 and is fabricated of low permeability moderator, such as low permeability graphite or the like. The cap is provided with vertical grooves 116 matching grooves 106 of the compacts. The cap is spaced from and below the lower end of the reflector block 87, as shown in FIGURE 4, so that a transverse passageway 117 is provided between the block 87 and the cap 115.

With the described arrangement, a purge stream of coolant gas passes through the porous reflector block 87 into the central passageway 89 between the plug 91 and the block 87, and then down into the transverse passageway 117. The purge gas then passes around the cap 115 and down the vertical passageways 108 and into the transverse passageways 105. The purge stream, as it passes across the face of the compacts, sweeps therewith fission products migrating from the compacts. These fission products are carried in the vertical passageways 108 to the transverse reflector block passageway 112, then to the central passageway 114 and into the coupling cavity 99, and pass from the fuel element through the coupling passageways 103, as previously described.

The purge gas stream containing the fission product then passes into connecting passageways 119 in a metal fuel element bottom rack 121, illustrated in FIGURE 4, which rack supports each of the fuel elements in a vertical position in the cluster, the metal coupling of each fuel element being seated within a suitable cavity 123 in the rack 121. As shown in FIGURE 4, the passageways 119 run between adjacent fuel elements in the cluster and lead to the central graphite element 77. The rack 121 is also provided with a plurality of holes 125 which allow the upward passage of coolant gas around the individual fuel elements in the cluster.

Purge gas containing fission products passes into a lower metal coupling 126 of the central element 77, as shown in FIGURE 4, from passageways 119, through suitable mating passageways 127 in the coupling. The coupling is secured to the bottom rack and extends down through the fission product trap vessel 35, to which it is also secured. The lower end of the coupling is seated on a nozzle 131 extending up through an opening 133 in the grid plate 19, as shown in FIGURE 4. A central passageway 135 extends down through the coupling 126 to the lower end thereof, mating with a similar passageway 137 in the nozzle 131. The central coupling passageway 135 is in communication with passageways 127 in the coupling whereby purge gas containing fission products is conducted to the fission product trap vessel 35. Such gas enters vessel 35 from the central passageway 135 through transverse openings 139 provided in the coupling wall. Such gas also re-enters the central passageway from the fission product trap vessel in the same manner and is conducted to the nozzle passageway 137 for removal to one or more fission product delay beds 57 disposed in the space 55 above the reflector 29, as by lines, etc. (not shown).

The fission product trap vessel 35 is fabricated of metal, such as stainless steel, and is hollow, being filled with a suitable fission product trapping agent, for example, one or more electropositive and/or electronegative agents specified in co-pending U.S. application Serial No. 128,275 to Koutz et al., such as copper or silver preferably on an absorbent carrier such as activated charcoal. The trap vessel is slidably supported in a vertical position on the grid plate, as previously indicated, by the support tube or sleeve 37, which can also be fabricated of stainless steel or the like, the sleeve being welded or otherwise secured to the grid plate. The fission product trap is located over the opening 133 in the grid plate.

The upper end of the fission product trap vessel 35 is provided with a flared portion 140 upon which the rack 121 is adequately supported, as shown in FIGURE 4.

The central element 77 of each cluster 33 does not contain fuel but is utilized as a means of maintaining the upper portion 45 of the top reflector 29 in spaced relation from the lower portion 47 of the top reflector. The central element also conveys fission products from the fuel elements of the cluster to the described fission product trap, as previously described, and to the grid plate nozzle 131. Furthermore, the central element is constructed so as to provide means whereby the cluster can be readily inserted into and removed from the reactor core without substantial tensile stress on the fuel elements.

The central element comprises, in addition to the described lower coupling 126, a cylindrical tube, preferably of graphite or the like, secured at the lower end thereof to the coupling 126, and containing a central passageway 141 extending longitudinally therethrough, into which passageway a metal lifting rod 142, as illustrated in FIGURE 4, can be inserted and releasably interconnected with the rack 121 through the coupling 126, as by a suitable means 143, such as the cammed groove and ball arrangement schematically illustrated in FIGURE 4, wherein the lifting rod is provided with cammed grooves 145 and the coupling 126 is provided with a ball 146, in order to move the cluster as a unit to and from the reactor core. The metal lifting rod assures that tensile stress is not put on the graphite fuel elements in moving the cluster. Instead, the metal rack and rod undergo any ensuing stress. When not in use, the metal lifting rod 142 is removed from the central element and is replaced by a graphite rod (not shown). Moreover, the passageway 141 in those positions in the core where control rods are to be located, is adapted to receive as shown in FIGURE 1, a control rod 69 passed down thereinto through the upper portion of the reflector block from the space 55.

The upper portion of the central element passes upwardly through a moderator (preferably graphite) top cluster block 147, a plurality of blocks 147 mating along the peripheries thereof to form the lower portion 47 of the top reflector 29 of the core. Each cluster block 147, shown in FIGURE 4 aids, as does the rack 121, in supporting the cluster in a vertical position in the reactor core, and in aligning individual fuel elements and the central element within the cluster. Each block 147 is generally approximately hexagonally shaped and is provided with a plurality of cavities 149, each of which receives a reduced head portion 151 of a given fuel element in the cluster. It is also provided with a plurality of holes 153 to allow the passage of coolant gas upwardly therethrough and into the space 49 between the upper and lower portions of the top reflector, as shown in FIGURE 4 and FIGURE 5, of the accompanying drawings. The reduced head of portion 151 is adapted to loosely receive a support pin 157 extending down from the upper surface of block 147 into the head, as shown in FIGURE 4. Although the pins aid in positioning the block 147 with respect to the fuel elements, they still permit the fuel elements to grow and to expand upwardly against the block 147 seated thereon, thereby reducing danger of cracking of the fuel elements.

The upper portion 39 of the central element 77 is provided with an expanded ring 159 which is received within suitable cavities 161 between adjoining top reflector blocks 43. Blocks 43 are formed of moderator such as graphite and collectively form the upper portion 45 of the top reflector 29 of the reactor core. As can be seen from FIGURE 4 and from FIGURE 2 of the accompanying drawings, the top reflector blocks 43 are hexagonally shaped and are joined together along lines converging at the center line of each fuel element cluster. This facilitates removal of the fuel element clusters from the core, as hereafter described.

As shown in FIGURES 1 and 4 of the accompanying drawings, the top reflector blocks 43 are supported in spaced relation above the blocks 147 by the support struts 39 comprising the upper portion of the central elements 77. The metal plates 51 secured by bolts 53 to the blocks 43 aid in keeping adjoining blocks 43 together. Accordingly, the previously described space 49 is provided whereby hot exhaust gas, after circulation up around the fuel elements, passes radially outwardly to the hot duct 17 and exits the pressure vessel 13, below the upper portion 45 of the top reflector 29.

With the described arrangement, in order to remove a given fuel element cluster, three adjoining top reflector blocks 43 and associated plates 51 and bolts 53 are removed. The graphite rod from the central element of the selected cluster is then removed and a metal lifting rod 142 is substituted. The rod 142 is releasably interconnected to the rack 121 and the cluster is lifted out of the core by the fuel handling machine 61. The cluster thus removed includes the fuel elements 75, central element 77, including coupling 126, rack 121, cluster block 147, and fission product trap vessel 35. Insertion of a new cluster into the reactor core can be made in the same manner, whereupon the lifting rod 142 is disengaged and withdrawn and stored adjacent the fuel handling machine, and a graphite rod is substituted therefor in the central element 77. In the case of clusters containing control rods 69, the control rod is first withdrawn and the metal lifting rod 142 is inserted for withdrawal of the cluster, as previously described.

The described arrangement provides easy and rapid handling of a group of fuel elements without imparting tensile stress thereto and permits semicontinuous loading and unloading of the reactor core during operation of the reactor from the space 55 within the reactor vessel.

A portion of the parameters of a typical 80 emw. high temperature, gas cooled nuclear reactor employing the first embodiment of the improved reactor core assembly of the present invention are set forth in the following table.

TABLE I

80 MEGAWATT REACTOR

I. Reactor and primary loop

REACTOR AND PRIMARY LOOP OPERATING CONDITIONS

| | |
|---|---|
| Core thermal power | 210 mwt. |
| Core active length | 8'. |
| Equivalent core dia. | 9.5'. |
| Core volume | 567 cu. ft. |
| Core power density | 13.1 kw./l. |
| Core voidage fraction | 20%. |
| Helium weight flow rate | 365 metric tons/hr. |
| Helium inlet temperature | 350° C. |
| Helium outlet temperature | 750° C. |
| Helium inlet pressure | 15 kg./cm.$^2$, abs. |
| Core pressure drop | 0.3 kg./cm.$^2$. |
| Primary loop pressure drop | 0.7 kg./cm.$^2$. |
| Ideal pumping power | 5000 M.P. |

REACTOR CORE

| | |
|---|---|
| Form | Hexagonal. |
| Number of fuel clusters | 61. |
| Number of fuel rods | 1098 (18 rods/cluster). |
| Fuel rod dimensions | 3" O.D. x 120" overall length x 96" active length. |
| Fuel compact dimensions | 2.25" O.D. x 1.5" I.D. |
| Fuel cluster form | Hexagonal. |
| Fuel cluster dimensions | 14" across flats x 141" long. |
| Number of control rods | 30. |
| Control rod form | Cylindrical. |
| Control rod dimensions | 2.5" O.D. x 165" long. |
| Control rod drives, type | Drum and cable with inertia braking. |

REACTOR VESSEL

| | |
|---|---|
| Form | Cylindrical, with hemispherical domes. |
| Dimensions | 16'7" O.D. x 40' long x 2.25" thick. |
| Material | Carlon steel. |
| Openings | Two 36" coolant inlets, two 36" coolant outlets, one 18" fuel charge port, one 18" discharge port, one 34" refueling machine port, one 12" dumping nozzle, thirty 6" control rod nozzles, minor openings for fission product scavenging instrumentation, etc. |
| Weight | 100 metric tons. |

REACTOR INTERNALS

| | |
|---|---|
| Thermal shield | Two 1" thick barrels. |
| Core and reflector support grid | Hexagonal grid, 10'4" across flats. |
| Internal fission product traps | Forty 12" O.D. x 12" long traps. |

The second embodiment of the improved reactor core assembly of the present invention is illustrated in FIGURE 7 and succeeding figures of the accompanying drawings. FIGURE 7 shows a portion of a nuclear reactor 175 which is adapted to provide a power level of, for example, about 20 megawatts and is relatively compact in size. The illustrated reactor core assembly 177 is similar to that previously described and illustrated in FIGURE 1 of the accompanying drawings, and includes a pressure vessel 179 within which is disposed a hexagonally shaped reactor core 181 supported on a grid plate 183 horizontally extending across the lower portion of the reactor vessel, and supported in spaced relation above the bottom of the reactor vessel. The grid plate 183 is connected at the periphery thereof to a thermal shield 185 which extends between the grid plate and the top of the reactor core 181 and is spaced from but adjacent the side wall 187 of the pressure vessel 179. It will be understood that components similar to those previously described in connection with the embodiment illustrated in FIGURES 1 to 6 of the accompanying drawings are constructed of similar materials.

Figure 11:
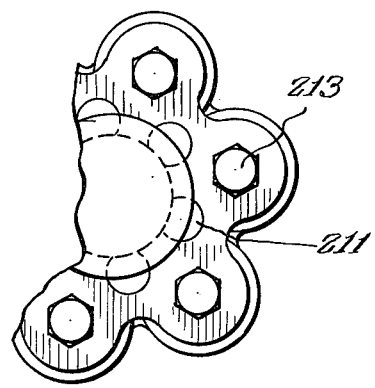
FIGURE 11 is a top plan view of the top block of the fuel element cluster of FIGURE 9; and, FIGURE 12 is a section through the bottom rack of the fuel element cluster, taken along the line 12—12 of FIGURE 10.
Figure 12:
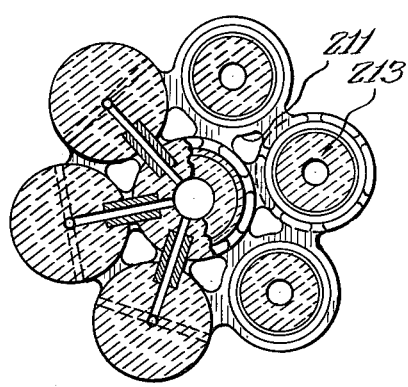

Surrounding the fuel element clusters 189 of the reactor core 181 is a side reflector 191. A bottom reflector 193 is disposed below the active portion of the fuel element clusters 189, the lower portion 195 of which reflector 193 is seated on the grid plate 183 and adjoining portions of the thermal shield 185, and the upper portion 197 of the bottom reflector being comprised of a lower portion 199 of each of the plurality of fuel element clusters 189, as shown in FIGURE 7. The upper portion of the bottom reflector is spaced from the lower portion of the bottom reflector, as shown in FIGURE 7, by suitable metal fission product take-off stalks 201 running down to fission product trap vessels 203 disposed within the lower portion 195 of the bottom reflector. Accordingly, a space 205 is provided between the two portions of the bottom reflector. This space 205 communicates with a concentric opening 207 in the side reflector 191 and thermal shield 185. Thus, gaseous coolant passes from an inlet duct 209 disposed about midway in the reactor vessel sidewall 187 down between the sidewall 187 and thermal shield 185 through the opening 207 and space 205 into contact with the fuel element clusters 189, as shown in FIGURE 7. Gaseous coolant from the inlet duct 209 also passes down between the thermal shield 185 and reactor vessel sidewall 187 into contact with the grid plate 183 for circulation up therethrough and through the lower portion 195 of the bottom reflector, cooling the fission product trap vessels 203, then passes up through space 205 and into contact with the fuel element clusters 189. Passageways 211 are provided in the fuel element clusters, as shown in FIGURES 10, 11 and 12, wherein the gaseous coolant passes upwardly between fuel elements 213 in each cluster, withdrawing heat therefrom and exiting the reactor vessel through the heat exhaust gas outlet duct 215 concentrically disposed with the inlet duct 209, the outlet duct 215 being the inner of the two ducts, as shown in FIGURE 7. Heat generated in the reactor core is thus transferred to auxiliary equipment (not shown) connected to the outlet duct, for conversion to power.

The construction of the top reflector 217 of the embodiment of FIGURE 7 is similar to that previously described for the reactor core assembly of FIGURE 1, and is adapted to facilitate passage of the hot exhaust gas from the fuel element clusters to the outlet duct. In this connection, the top reflector 217 as shown in FIGURE 7 comprises a lower portion 219 made up of an upper portion 221 of each of the plurality of fuel element clusters. The upper portion 223 of the top reflector is spaced upwardly from the lower portion and is held in position above the lower portion 219 of the top reflector by a plurality of struts 227 comprising the upper ends 229 of central elements 231 of the fuel element clusters in the reactor core. The space 225 communicates with the passageways 211 between the fuel elements 213, of each cluster and also with the outlet duct 215, as shown in FIGURE 7. Thus, hot exhaust coolant passes radially outwardly therein from the fuel element clusters to the illustrated outlet duct 215.

The upper portion 223 of the top reflector is comprised as in the embodiment of FIGURE 1, of a plurality of hexagonal top reflector blocks 233, shown in FIGURE 8, over which are disposed hexagonal metal plates 235, secured as by bolts 237, also shown in FIGURE 8, the plates acting as sealing surfaces.

The described arrangement provides a space 239 between the top of the reactor core and the upper end of the reactor vessel, which space is thermally shielded from the hot exhaust gas in space 225 by the top reflector blocks 233. Moreover, a portion of the inlet coolant passes into the space 239, as shown in FIGURE 7, thus maintaining the space 239 at about the temperature of the coolant at the inlet. This allows the space 239 to be utilized for the same purposes as described in connection with the embodiment of FIGURE 1, i.e., as an area in which simplified control rod handling means 241 and fuel handling and storage equipment 243, as well as fission product delay beds 245, substantially as previously described can be disposed, as shown in FIGURE 7. Control rods 247 pass into the reactor core through the upper portion 223 of the top reflector and, as with the first embodiment, are shielded from the hot exhaust coolant in space 225 by passing down into suitable cavities 249 in selected central elements 231 of the fuel element clusters, as shown in FIGURE 7 and in FIGURE 10.

With the described arrangement of components for the reactor core assembly 177, the cold coolant entering through the inlet duct passes to both the bottom and the top of the reactor core, i. e., to the space below the grid plate and also space 205, as well as space 239, thus maintaining the reactor core in hydrodynamic equilibrium and increasing the durability and stability thereof.

Figure 9:
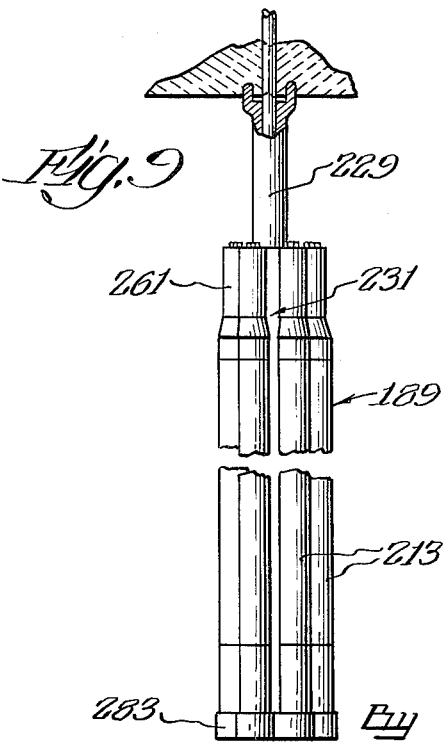
FIGURE 9 is a side elevation of a typical fuel element cluster supported in the reactor core of FIGURE 7.

Now referring more particularly to FIGURE 9 of the accompanying drawings, a typical fuel element cluster 189 utilized in the reactor core shown in FIGURE 7 is illustrated. The fuel element cluster comprises a plurality, such as 6, of the fuel-containing elements 213 disposed in an annular array around the central element 231.

Each fuel element 213 is basically similar to the fuel elements 75 shown in FIGURE 4, in that it includes a cylindrical container 251 largely fabricated of moderator such as graphite, which has been suitably treated to have the previously described low permeability to the passage of fission products. The container has a sleeve portion 254 joined at the upper end to an upper reflector block 253 fabricated of normal graphite or other moderator relatively permeable to fission products and joined at the bottom end to a lower reflector block 255. The upper reflector block 253 has a tapered head 257 which is loosely received in a cavity 259 in a top cluster block 261 extending between and around all elements of the cluster and generally corresponding to the cluster block 147 of the first embodiment. The head 257 has a cavity 263 within which is loosely received a pin 265 loosely retaining the fuel element in position in the cluster. The block 253 of each fuel element is also provided with, as shown in FIGURE 10, a transverse passageway 267 through which a coolant purge stream enters the fuel element, and a connecting central passageway 269 terminating at the lower end of the block 253.

The lower block 255 of the fuel element may be formed of one or more component blocks 256 and includes a transverse passageway 271 at the upper end thereof and a connecting central passageway 273 leading down to and connecting with a transverse purge gas exit passageway 275 near the lower end of the fuel element, as shown in FIGURE 10. The passageway 275 is formed in a transverse insert 277 fabricated of stainless steel or the like metal, graphite, etc., and disposed in the fuel element, the opposite end of which insert is disposed in a central gas collecting component 279 forming the lower end portion of the central element 231, as shown in FIGURE 10. Also, as shown in FIGURE 10, the lower end of the block 255 is received with a suitably shaped metal support fitting 281 forming a portion of a bottom support plate or rack 283 extending between and around the elements of the cluster, and acting to interconnect such elements and to maintain them in proper alignment with respect to each other. Also aiding in such alignment is the top cluster block 261 and associated pins 265. In addition, a second support plate 285, as shown in FIGURE 10, extends between and around the elements of the cluster at a level above the first support plate 283 but in the low reflector block 255 region of the fuel element. Plate 285 further aids in maintaining alignment of components of the cluster.

The active portion of each fuel element 213 of the cluster extends between the upper and lower reflector blocks 253 and 255, respectively, and comprises a plurality of annular ring shaped fuel compacts 287 stacked on a vertical central moderator spine 289, substantially identical in arrangement, composition and construction to that previously described in connection with the first embodiment illustrated in FIGURE 4. The compacts and spine are supported on the lower reflector block 255. The cap 291 rests on the uppermost compact and is spaced below the lower end of the upper reflector block 253 to provide a transverse purge gas space 293. The cap and compacts are provided with transverse passageways 295 and interconnecting vertical passageways 297 along the faces thereof to facilitate passage of purge gas from the space 293 down over compacts and to the lower end of the fuel element, sweeping fission products therewith.

Thus, the purge gas enters the fuel element through passageway 267, passes down through passageway 269 to space 293, then through passages 295 and 297 to transverse passageway 271, down passage 273 and out of the fuel element through exit passageway 275. The purge stream, upon exiting each fuel element 213, passes to the component 279 through the passageway 275 in each insert 277. The component 279 is held in place within the cluster by means of the metal bottom plate 283 and associated metal fitting 281 disposed around the lower end thereof and by means of inserts 277. The component 279 is provided with transverse passages 301 connecting with passageways 275 and with a central vertical purge stream passage 303 which leads down to the lower end of the component 279 and connects with a similar passage 305 through the fitting 281. The passage 305 in turn connects with a passage 307 in the take-off stalk 201. Passage 307 continues through the stalk 201 down to a connecting passage (not shown) running through the associated fission product trap vessel 203 disposed in the lower portion 195 of the bottom reflector 193.

Thus, the purge stream containing fission products passes from each fuel element in the cluster to and down through the component 279, then through the stalk 201 to the fission product trap vessel 203. The purge stream passes from the lower end of the trap vessel by suitable passages (not shown) down through the grid plate and to the one or more fission product delay beds 245 disposed in the space 239 above the reactor core, as by suitable lines (not shown).

The central element 231 in each cluster has the previously described function of providing at the upper end thereof above the level of the remainder of the fuel cluster the support strut 227. The terminal portion of such upper end is provided with a ring 309 which fits into cavities 311 in adjoining top reflector blocks 233, locking the blocks together.

The central element 231 runs down through an opening in the cluster block 261, tapers at the lower end thereof, terminating at about the level of the second support plate 285, as shown in FIGURE 10. A metal nut 313 with internal thread is secured to the underside of the plate 285 and is adapted to releasably secure by the thread, a graphite rod (not shown) of the central element and, in place of such graphite rod when the cluster is to be insterted or withdrawn from the reactor core, a metal lifting rod 315. Also, as shown in FIGURE 10, the central element may be adapted to receive a control rod 247 which can be lowered down through the top reflector blocks into the central element by the control rod handling means 241. The upper tapered end of the component 279 may also project into an opening 317 in the center of the nut, as shown in FIGURE 10. Accordingly, an improved reactor core assembly for a relatively small reactor but having substantially the same advantages as those described in connection with the embodiment of FIGURES 1 to 6, is illustrated in FIGURES 7 to 12 of the accompanying drawings. In addition, such core assembly provides for a separate flow of coolant to the cluster fission product traps and for containment of such traps within a portion of a split bottom reflector. Some parameters of a typical 20 megawatt high temperature, gas cooled nuclear reactor which can employ the reactor core assembly set forth in the second embodiment are listed in the table below:

TABLE II
20 MEGAWATT NUCLEAR REACTOR

I. *Reactor and primary loop*

REACTOR AND PRIMARY LOOP OPERATING CONDITIONS

| | |
|---|---|
| Core thermal power | 60 mw. |
| Core active length | 6 ft. |
| Equivalent core diameter | 6.75 ft. |
| Core volume | 218 cu. ft. |
| Core power density | 9.8 kw.$_{th}$/l. |
| Core voidage fraction | 13%. |
| Helium weight flow | $104 \times 10^3$ kg./hr. |
| Helium inlet temperature | 350° C. |
| Helium outlet temperature | 750° C. |
| Helium inlet pressure | 20 kg./cm.$^2$. |
| Core pressure drop | 0.16 kg./cm.$^2$. |
| Total primary loop pressure drop | 0.33 kg./cm.$^2$. |
| Pumping power | 0.75 mw. |
| Total weight helium | 110 lb. |
| Total volume helium | 1300 cu. ft. |

REACTOR CORE

| | |
|---|---|
| Form | Hexagonal. |
| Number of fuel clusters | 91. |
| Number of rods per cluster (active) | 6. |
| Number of rods per cluster (graphite or control) | 1. |
| Total rods per cluster | 7. |
| Total rods in core (active) | 546. |
| Fuel rod diameter | 3 in. |
| Fuel rod length (active) | 6 ft. |
| Fuel compact dimensions | 2.25" O.D. x 15" I.D. |
| Fuel cluster dimensions | 9.08" across corners. 7.5" across flats. 8 ft. length. |
| Number of control rods | 31 |
| Control rod diameter | 2 in. |
| Control rod drives | Drum and cable with inertia braking. |

REACTOR VESSEL

| | |
|---|---|
| Form | Cylindrical with ellipitical ends. |
| Diameter | 12 ft. inside. |
| Length | 24 ft. inside. |
| Thickness | 1.5 in. |
| Material | Carbon steel. |

Openings:

| | |
|---|---|
| One annular duct to boiler | 45 in. inside outer duct. 33 in. inner duct. |
| Two 16 in. fuel charge and discharge ports. | |
| Two 16 in. auxiliary cooler ducts. | |
| One 34 in. fuel transfer machine port. | |
| 24—4 in. control rod tubes. | |
| Weight | 25 tons. |

REACTOR INTERNALS

| | |
|---|---|
| Internal thermal shield | 1 in. steel. |
| Number lower internal F.P. traps | 91. |
| Number upper internal F.P. traps | 18. |
| Number dust separators | 4. |
| Dimensions lower F.P. traps | 3 in. dia. x 18 in. long. |
| Dimensions upper F.P. traps | 15 in. dia. x 5 ft. long. |
| Dimensions dust separators | 15 in. dia. x 5 ft. long. |
| Cooling helium upper F.P. traps | 25° C. |

Accordingly, a novel and improved reactor core assembly equally adapted for use in low and high power high temperature gas cooled nuclear reactors is provided, which includes an improved fuel element arrangement in the form of readily removable and insertable fuel element clusters. The fuel element clusters and control rods can be withdrawn and inserted during operation of the reactor by simplified fuel and control rod handling means disposed within an upper cool portion of the reactor pressure vessel. Effective fission product containment is also provided within the upper cool portion in the reactor vessel and also within the reactor core itself. The reactor core assembly is relatively compact and is in hydrodynamic balance. Various other advantages of the present invention are set forth in the foregoing.

Various of the features of the present invention are set forth in the appended claims.

What is claimed is:

1. An improved reactor core assembly for a gas cooled high temperature nuclear reactor, said assembly including a reactor pressure vessel within which are disposed a core, a horizontally extending grid plate for supporting said core, a side reflector fabricated of neutron moderating material and disposed along the side of said core, thermal shielding disposed between said side reflector and the side wall of said pressure vessel, a bottom reflector below the fuel-containing portion of said core and fabricated of neutron moderating material, a top reflector above the fuel-containing portion of said core and fabricated of neutron moderating material, said top reflector comprising a lower portion and an upper portion positioned above and spaced from said lower portion to define an exhaust gas space, an exhaust gas outlet disposed between said lower and said upper portions of said top reflector and in direct communication with said exhaust gas space, said upper portion of said top reflector and the portion of said pressure vessel above said upper portion of said top reflector defining an upper space, a coolant gas inlet in communication with said upper space and with said grid plate, whereby a portion of the flow of gas from said inlet is fed into said upper space and said core is adapted to be maintained in hydrodynamic balance.

2. An improved reactor core assembly for a gas cooled high temperature nuclear reactor, said assembly including a reactor pressure vessel within which are disposed a nuclear fuel-containing core, a horizontally extending grid plate, for supporting said core, a side reflector fabricated of neutron moderating material and disposed along the side of said core, thermal shielding disposed between said side reflector and the side wall of said pressure vessel and spaced from the latter, to form a passageway, a bottom reflector below the fuel containing portion of said core and fabricated of neutron moderating material, a top reflector above the fuel-containing portion of said core and fabricated of neutron moderating material, said top reflector comprising a lower portion and an upper portion positioned above and spaced from said lower portion to define an exhaust gas space, an exhaust gas outlet disposed between said lower and said upper portions of said top reflector and direct communication with said exhaust gas space, said upper portion of said top reflector and the portion of said pressure vessel above said upper portion of said top reflector defining an upper space, a coolant gas inlet disposed below said grid plate and in communication with said grid plate and with said upper space through said passageway, whereby a minor portion of the flow of gas from said inlet is fed directly into said upper space and said core is adapted to be maintained in hydrodynamic balance.

3. An improved reactor core assembly for a gas cooled high temperature nuclear reactor, said assembly including a reactor pressure vessel within which are disposed a nuclear fuel-containing reactor core, a horizontally extending grid plate, for supporting said core, a side reflector fabricated of neutron moderating material and disposed along the side of said core, thermal shielding disposed between said side reflector and the side wall of said pressure vessel and spaced from the latter, to form a passageway, a bottom reflector below the fuel-containing portion of said core and fabricated of neutron moderating material, said bottom reflector comprising a lower portion and an upper portion positioned above and spaced from said lower portion to define a coolant gas space, a top reflector above the fuel-containing portion of said core and fabricated of neutron moderating material, said top reflector comprising a lower portion and an upper portion positioned above said lower portion to define an exhaust gas space, an exhaust gas outlet disposed between said lower and said upper portions of said top reflector and in direct communication with said exhaust gas space, said upper portion of said top reflector and the portion of said pressure vessel above said upper portion of said top reflector defining an upper space, a gas inlet disposed concentric with said exhaust gas outlet for feeding coolant gas to said upper space and to said coolant gas space and said grid plate, said passageway connecting said upper space and said gas coolant space whereby said core is maintained in hydrodynamic balance.

4. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet in communication with said upper space and with said grid plate, whereby said core is adapted to be maintained in hydrodynamic balance, said core including a plurality of fuel element clusters, each of said clusters comprising a plurality of fuel-elements disposed around a central element, the upper end of which central element supports said upper portion of said top reflector in spaced relation from said lower portion of said top reflector, each fuel element having a lower portion forming a part of the bottom reflector of said core and an upper portion forming a part of the lower portion of said top reflector.

5. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said presure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet positioned adjacent the bottom of said pressure vessel and in communication with said upper space and with said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the bottom reflector of said core and an upper portion forming a part of the lower portion of said top reflector.

6. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, bottom reflector fabricated of neutron moderating material and positioned below the fuel-containing portion of said core, said bottom reflector comprising a lower portion and an upper portion positioned above said lower portion to define a coolant gas space, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet concentric with said exhaust gas outlet and in communication with said upper space and with said coolant gas space and said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the upper portion of the bottom reflector of said core and an upper portion forming a part of the lower portion of said top reflector, and a fission product take-off stalk supporting each cluster in spaced relation from the lower portion of said bottom reflector.

7. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet in communication with said upper space and with said grid plate, whereby said core is adapted to be maintained in hydrodynamic balance, said core including a plurality of fuel element clusters, each of said clusters comprising a plurality of fuel-elements disposed around a central element, the upper end of which central element supports said upper portion of said top reflector in spaced relation from said lower portion of said top reflector, each fuel element having a lower portion forming a part of the bottom reflector of said core, and an upper portion of each fuel element forming a part of the lower portion of said top reflector, each of said clusters including a metallic support component disposed around said elements of said clusters and adjacent the bottom of said cluster, each of said clusters also including a second support component fabricated of neutron moderating material disposed around the elements of said cluster adjacent the top thereof and forming part of the lower portion of said top reflector, said metallic support component and said second support component being adapted to maintain each of said elements in spaced relation from the remaining elements in said cluster, each of said central elements being hollow and adapted to receive a lifting rod in releasable engagement with said metallic support component, at least some of said central elements also being adapted to receive a core control rod, said upper portion of said top reflector being comprised of a plurality of matching blocks, at least some of said blocks meeting at the mid-line of each cluster, whereby removal of said cluster from said core is facilitated.

8. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet positioned adjacent the bottom of said pressure vessel and in communication with said upper space and with said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the bottom reflector of said core and an upper portion forming a part of the lower portion of said top reflector, each of said clusters including a metallic support component disposed around said elements of said clusters and adjacent the bottom of said clusters, each of said clusters also including a second support component fabricated of neutron moderating material disposed around the elements of said cluster adjacent the top thereof and forming part of the lower portion of said top reflector, said metallic support component and said second support component being adapted to maintain each of said elements in spaced relation from the remaining elements in said cluster, each of said central elements being hollow and adapted to receive a lifting rod in releasable engagement with said metallic support component, at least some of said central elements also being adapted to receive a core control rod, said upper portion of said top reflector being comprised of a plurality of matching blocks, at least some of said blocks meeting at the mid-line of each cluster, whereby removal of said cluster from said core is facilitated.

9. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, said bottom reflector comprising a lower portion and an upper portion positioned above said lower portion to define a coolant gas space, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet concentric with said exhaust gas outlet and in communication with said upper space and with said coolant gas space and said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the upper portion of the bottom reflector of said core and an upper portion forming a part of the lower portion of said top reflector, a fission product take-off stalk supporting each cluster in spaced relation from the lower portion of said bottom reflector, each of said clusters including a metallic support component disposed around said elements of said cluster and adjacent the bottom of said cluster, each of said clusters also including a second support component fabricated of neutron moderating material disposed around the elements of said cluster adjacent the top thereof and forming part of the lower portion of said top reflector, said metallic support component and said second support component being adapted to maintain each of said elements in spaced relation from the remaining elements in said cluster, each of said central elements being hollow and adapted to receive a lifting rod in releasable engagement with said metallic support component, at least some of said central elements also being adapted to receive a core control rod, said upper portion of said top reflector being comprised of a plurality of matching blocks, at least some of said blocks meeting at the mid-line of each cluster, whereby removal of said cluster from said core is facilitated.

10. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet in communication with said upper space and with said grid plate, whereby said core is adapted to be maintained in hydrodynamic balance, said core including a plurality of fuel element clusters, each of said clusters comprising a plurality of fuel-elements disposed around a central element, the upper end of which central element supports said upper portion of said top reflector in spaced relation from said lower portion of said top reflector, each fuel element having a lower portion forming a part of the lower reflector of said core and an upper portion forming a part of the lower portion of said top reflector, each of said clusters including a metallic support component disposed around said cluster adjacent the bottom thereof and a second support component fabricated of neutron moderating material disposed around said cluster adjacent the top thereof and forming part of the lower portion of said top reflector, said metallic support component and said second support component being adapted to maintain each of said elements in spaced relation in said cluster, said metallic support component including passages adapted to convey coolant purge gas from said fuel elements to said central element, each of said fuel elements including a container fabricated of low permeability neutron moderating material having an upper end porous to coolant purge gas and adapted to be received in said second support component, and a lower end adapted to be received in said metallic support component, said lower end being provided with a purge gas outlet for conveying coolant purge gas to said metallic support component, a plurality of annular nuclear fuel-containing compacts disposed around a central spine of neutron moderating material, said compacts being arranged to define a purge gas space in communication with said inlet and said outlet, whereby fission products migrating from said compacts are swept by coolant purge gas to said outlet for removal to said central element, a fission product trap vessel disposed below the metallic support component of said cluster, said central element including means for conveying said purge gas towards said fission product trap.

11. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet positioned adjacent the bottom of said pressure vessel and in communication with said upper space and with said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the bottom reflector of said core and an upper portion forming a part of the lower portion of said top reflector, each of said clusters including a metallic support component disposed around said cluster adjacent the bottom thereof and a second support component fabricated of neutron moderating material disposed around said cluster adjacent the top thereof and forming part of the lower portion of said top reflector, said metallic support component and said second support component being adapted to maintain each of said elements in spaced relation in said cluster, said metallic support component including passages adapted to convey coolant purge gas from said fuel elements to said central element, each of said fuel elements including a container fabricated of low permeability neutron moderating material having an upper end porous to coolant purge gas and adapted to be received in said second support component, and a lower end adapted to be received in said metallic support component, said lower end being provided with a purge gas outlet for conveying coolant purge gas to said metallic support component, a plurality of annular nuclear fuel-containing compacts disposed around a central spine of neutron moderating material, said compacts being arranged to define a purge gas space in communication with said inlet and said outlet, whereby fission products migrating from said compacts are swept by coolant purge gas to said outlet for removal to said central element, a fission product trap vessel disposed below the metallic support component of said cluster, said central element including means for conveying said purge gas towards said fission product trap, said fission product trap being connected to said central element and being adapted to support the weight of said cluster on said grid plate.

12. An improved reactor core assembly for a gas cooled high temperature nuclear reactor, said assembly including a reactor pressure vessel within which are disposed a fuel-containing core supported on a horizontally extending grid plate, a side reflector fabricated of neutron moderating material and disposed along the side of the fuel-containing portion of said core, thermal shielding disposed between said side reflector and the side wall of said pressure vessel and spaced from the latter, a bottom reflector fabricated of neutron moderating material and positioned below the fuel-containing portion of said core, said bottom reflector comprising a lower portion and an upper portion positioned above said lower portion to define a coolant gas space, a top reflector above the fuel-containing portion of said core, said top reflector being fabricated of neutron moderating material and comprising a lower portion and an upper portion positioned above said lower portion to define an exhaust gas space, an exhaust gas outlet disposed between said lower and said upper portions of said top reflector and in communication with said exhaust gas space, said upper portion of said top reflector and the portion of said pressure vessel above said upper portion of said top reflector defining an upper space, a coolant gas inlet concentric with said exhaust gas outlet and in communication with said upper space and with said coolant gas space and said grid plate, whereby said core is adapted to be maintained in hydrodynamic balance, said core including a plurality of fuel element clusters, each of said clusters comprising a plurality of nuclear fuel-containing elements disposed around a central element, the upper end of which central element supports said upper portion of said top reflector in spaced relation from said lower portion of said top reflector, each fuel element having a lower portion forming a part of the upper portion of the bottom reflector of said core and an upper portion forming a part of the lower portion of said top reflector, a fission product take-off stalk supporting each cluster in spaced relation from the lower portion of said bottom reflector, each of said clusters including a metallic support component disposed around said cluster adjacent the bottom thereof and a second support component fabricated of neutron moderating material disposed around said cluster adjacent the top thereof and forming part of the lower portion of said top reflector, said metallic support component and said second support component being adapted to maintain each of said elements in spaced relation in said cluster, said metallic support component including passages adapted to convey coolant purge gas from said fuel elements to said central element, each of said fuel elements including a container fabricated of low permeability neutron moderating material having an upper end porous to coolant purge gas and adapted to be received in said second support component, and a lower end adapted to be received in said metallic support component, said lower end being provided with a purge gas outlet for conveying coolant purge gas to said metallic support component, a plurality of annular nuclear fuel-containing compacts disposed around a central spine of neutron moderating material, said compacts being arranged to define a purge gas space in communication with said inlet and said outlet, whereby fission products migrating from said compacts are swept by coolant purge gas to said outlet for removal to said central element, a fission product trap vessel disposed below the metallic support component of said cluster, said central element including means for conveying said purge gas towards said fission product trap, said fission product trap being disposed in the lower portion of said bottom reflector, said fission product take-off stalk interconnecting said fission product trap and said central element, said stalk having a passageway adapted to convey coolant purge gas from said central element to said trap.

13. An improved fuel element cluster for the core of a gas cooled high temperature nuclear reactor, having a bottom reflector, and a top reflector which includes spaced upper and lower portions, which cluster comprises a plurality of elongated fuel elements disposed in an annular array around a central elongated element fabricated of neutron moderating material, a metallic support component disposed around said elements adjacent the lower end of said cluster, a second support component fabricated of neutron moderating material disposed around said central element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element having a part extending upwardly beyond the remainder of said cluster so as to engage and support the upper portion of the top reflector in spaced relation above the lower portion of said top reflector in said core.

14. An improved fuel element cluster for a gas cooled high temperature nuclear reactor, which cluster comprises a plurality of elongated fuel elements disposed in an annular array around a central elongated element fabricated of neutron moderating material, metallic support component disposed around said elements adjacent the lower end of said cluster, a second support component fabricated of neutron moderating material disposed around said element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element extending upwardly beyond the remainder of said cluster and adapted to engage and support the upper portion of a top reflector in spaced relation above the lower portion of said top reflector in said core, said central element having a cavity adapted to receive a lifting rod for releasable engagement with said metallic support component, whereby handling of said cluster is facilitated, said cavity also being adapted to receive a core control rod.

15. An improved fuel element cluster for a gas cooled high temperature nuclear reactor, which cluster comprises a plurality of elongated fuel elements disposed in an annular array around a central elongated element fabricated of neutron moderating material, metallic support component disposed around said elements adjacent the lower end of said cluster, a second support component fabricated of neutron moderating material disposed around said element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element extending upwardly beyond the remainder of said cluster and adapted to engage and support the upper portion of a top reflector in spaced relation above the lower portion of said top reflector in said core, each of said fuel elements including a container fabricated of low permeability neutron moderating material having an upper end porous to coolant purge gas and forming a gas inlet, and adapted to be received in said second support component, and a lower end adapted to be received in said metallic support component, said lower end being provided with a gas outlet for conveying coolant purge gas to said metallic support component, a stack of annular nuclear fuel-containing compacts disposed around a central spine of neutron moderating material, said compacts being spaced from the side wall of said container to define a purge gas space in communication with said gas inlet and said gas outlet, whereby fission products migrating from said compacts are swept by coolant purge gas to said gas outlet for removal to said central element.

16. An improved fuel element cluster for a gas cooled high temperature nuclear reactor, which cluster comprises a plurality of elongated fuel elements disposed in an annular array around a central elongated element fabricated of neutron moderating material, metallic support component disposed around said elements adjacent the lower end of said cluster, a second support component fabricated of neutron moderating material disposed around said element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element extending upwardly beyond the remainder of said cluster and adapted to engage and support the upper portion of a top reflector in spaced relation above the lower portion of said top reflector in said core, each of said fuel elements including a container fabricated of low permeability neutron moderating material having an upper end porous to coolant purge gas and forming a gas inlet, and adapted to be received in said second support component, and a lower end adapted to be received in said metallic support component, said lower end being provided with a gas outlet for conveying coolant purge gas to said metallic support component, a stack of annular nuclear fuel-containing compacts disposed around a central spine of neutron moderating material, said compacts being spaced from the side wall of said container to define a purge gas space in communication with said gas inlet and said gas outlet, whereby fission products migrating from said compacts are swept by coolant purge gas to said gas outlet for removal to said central element, said metallic support component including a plurality of passageways adapted to convey coolant purge gas from said fuel elements to said central element, a fission product trap vessel disposed below the metallic support component of said cluster, said central element having connecting passageways adapted to convey said purge gas from said metallic support component towards said fission product trap.

17. An improved fuel element cluster for a gas cooled high temperature nuclear reactor, which cluster comprises a pluraltiy of elongated fuel elements disposed in an annular array around a central elongated element fabricated of neutron moderating material, metallic support component disposed around said elements adjacent the lower end of said cluster, a second support component fabricated of neutron moderating material disposed around said element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element extending upwardly beyond the remainder of said cluster and adapted to engage and support the upper portion of a top reflector in spaced relation above the lower portion of said top reflector in said core, each of said fuel elements including a container fabricated of low permeability neutron moderating material having an upper end porous to coolant purge gas and forming a gas inlet, and adapted to be received in said second support component, and a lower end adapted to be received in said metallic support component, said lower end being provided with a gas outlet for conveying coolant purge gas to said metallic support component, a stack of annular nuclear fuel-containing compacts disposed around a central spine of neutron moderating material, said compacts being spaced from the side wall of said container to define a purge gas space in communication with said gas inlet and said gas outlet, whereby fission products migrating from said compacts are swept by coolant purge gas to said gas outlet for removal to said central element, said metallic support component including a plurality of passageways adapted to convey coolant purge gas from said fuel elements to said central element, a fission product trap vessel disposed below the metallic support component of said cluster, said central element having connecting passageways adapted to convey said purge gas from said metallic support component towards said fission product trap, said fission product trap being connected to said central element and being adapted to support the weight of said cluster through said metallic support component.

18. An improved fuel element cluster for a gas cooled high temperature nuclear reactor, which cluster comprises a plurality of elongated fuel elements disposed in an annular array around a central elongated element fabricated of neutron moderating material, metallic support component disposed around said elements adjacent the lower end of said cluster, a second support component fabricated of neutron moderating material disposed around said element and forming a part of the lower portion of said top reflector, said metallic support component and said second support component maintaining said elements in spaced relation from one another in said cluster, each of said fuel elements comprising an upper portion fabricated of neutron moderating material and forming part of the lower portion of said top reflector, a central nuclear fuel-containing section and a lower section fabricated of neutron moderating material and forming a part of the bottom reflector of said nuclear reactor core in which the cluster is to be disposed, said central element extending upwardly beyond the remainder of said cluster and adapted to engage and support the upper portion of a top reflector in spaced relation above the lower portion of said top reflector in said core, each of said fuel elements including a container fabricated of low permeabiltiy neutron moderating material having an upper end porous to coolant purge gas and forming a gas inlet, and adapted to be received in said second support component, and a lower end adapted to be received in said metallic support component, said lower end being provided with a gas outlet for conveying coolant purge gas to said metallic support component, a stack of annular nuclear fuel-containing compacts disposed around a central spine of neutron moderating material, said compacts being spaced from the side wall of said container to define a purge gas space in communication with said gas inlet and said gas outlet, whereby fission products migrating from said compacts are swept by coolant purge gas to said gas outlet for removal to said central element, said metallic support component including a plurality of passageways adapted to convey coolant purge gas from said fuel elements to said central element, a fission product trap vessel disposed below the metallic support component of said cluster, said central element having connecting passageways adapted to convey said purge gas from said metallic support component towards said fission product trap, a fission product take-off stalk interconnecting said fission product trap and said central element, said stalk having a passageway adapted to convey coolant purge gas from said central element to said trap.

19. An improved reactor core assembly for a gas cooled high temperature nuclear reactor, said assembly including a reactor vessel within which are disposed a nuclear fuel-containing reactor core, a horizontally extending grid plate for supporting said core, a side reflector fabricated of neutron moderating material and disposed along the side of said core, in a bottom reflector below the fuel-containing portion of said core and fabricated of neutron moderating material, said bottom reflector comprising a lower portion and an upper portion positioned and spaced from said lower portion to define a lower coolant gas space, a top reflector above the fuel-containing portion of said core and fabricated of neutron moderating material, said top reflector comprising a lower portion and an upper portion positioned above and spaced from said lower portion to define an exhaust gas space, an exhaust gas outlet disposed between said lower and said upper portions of said top reflector and in direct communication with said exhaust gas space, said upper portion of said top reflector and the portion of said pressure vessel above said upper portion of said top reflector defining an upper space, a gas inlet disposed concentric with said exhaust gas outlet for feeding coolant gas to said upper space and to said lower coolant gas space and said grid plate, whereby said core is maintained in hydrodynamic balance.

References Cited by the Examiner
UNITED STATES PATENTS

| | | | |
|---|---|---|---|
| 2,938,845 | 5/60 | Treshow | 204—193.26 |
| 2,984,609 | 5/61 | Dickson et al. | 204—193.9 |
| 2,999,059 | 9/61 | Treshow | 204—154.2 |
| 3,010,889 | 11/61 | Fortescue et al. | 204—193.34 |
| 3,039,947 | 6/62 | Fortescue et al. | 204—193.21 |

FOREIGN PATENTS

| | | |
|---|---|---|
| 1,226,735 | 7/60 | France. |
| 872,091 | 7/61 | Great Britain. |

REUBEN EPSTEIN, *Acting Primary Examiner.*

CARL D. QUARFORTH, *Examiner.*

UNITED STATES PATENT OFFICE
CERTIFICATE OF CORRECTION

Patent No. 3,207,670                        September 21, 1965

Peter Fortescue et al.

It is hereby certified that error appears in the above numbered patent requiring correction and that the said Letters Patent should read as corrected below.

Column 2, line 70, for "impoved" read -- improved --; column 3, line 41, strike out "assembly", first occurrence; column 22, line 18, for "imroved" read -- improved --; same column 22, lines 18 and 45, column 23, lines 8 and 54, and column 24, line 28, after "for", each occurrence, insert -- the core of --; column 22, lines 19 and 46, column 23, lines 9 and 55, and column 24, line 29, after "reactor", each occurrence, insert -- having a bottom reflector, and a top reflector which includes spaced upper and lower portions --; column 22, lines 22 and 49, column 23, lines 12 and 58, and column 24, line 32, after "material,", each occurrence, insert -- a --; column 22, lines 25 and 53, column 23, lines 16 and 62, and column 24, line 36, after "said", each occurrence, insert -- central --; column 22, lines 36 and 64, column 23, lines 27 and 73, and column 24, line 47, after "element", each occurrence, insert -- having a part --; column 22, lines 37 and 65, column 23, lines 28 and 74, and column 24, line 48, for "and adapted", each occurrence, read -- so as --; column 22, lines 38 and 66, column 23, lines 29 and 75, and column 24, line 49, for "a", each occurrence, read -- the --.

Signed and sealed this 5th day of July 1966.

(SEAL)
Attest:

ERNEST W. SWIDER

Attesting Officer                              EDWARD J. BRENNER
                                               Commissioner of Patents